US012139856B2

(12) United States Patent
Chen et al.

(10) Patent No.: US 12,139,856 B2
(45) Date of Patent: Nov. 12, 2024

(54) FORMING MACHINE FOR PULP PRODUCT

(71) Applicant: Yulan Green Technology Co., Ltd., Yilan County (TW)

(72) Inventors: Chun-Hsiung Chen, Yilan County (TW); Kao-Yi Chang, Yilan County (TW)

(73) Assignee: Yulan Green Technology Co., Ltd., Yilan County (TW)

( * ) Notice: Subject to any disclaimer, the term of this patent is extended or adjusted under 35 U.S.C. 154(b) by 0 days.

(21) Appl. No.: 18/209,236

(22) Filed: Jun. 13, 2023

(65) Prior Publication Data

US 2024/0052577 A1 Feb. 15, 2024

(30) Foreign Application Priority Data

Aug. 10, 2022 (TW) ................................. 111130105

(51) Int. Cl.
*B21J 3/00* (2006.01)
*B30B 15/34* (2006.01)
*D21J 3/00* (2006.01)

(52) U.S. Cl.
CPC ................ *D21J 3/00* (2013.01); *B30B 15/34* (2013.01)

(58) Field of Classification Search
CPC .................................. D21J 3/00; B30B 15/34
See application file for complete search history.

(56) References Cited

FOREIGN PATENT DOCUMENTS

| | | |
|---|---|---|
| CN | 108221497 A | 6/2018 |
| CN | 213925672 U | 8/2021 |

OTHER PUBLICATIONS

Search Report appended to an Office Action, which was issued to Taiwanese counterpart application No. 111130105 by the TIPO on Oct. 5, 2022, with an English translation thereof.

*Primary Examiner* — Lucas E. A. Palmer

(57) ABSTRACT

A forming machine for a pulp product includes a frame unit defining a forming zone, two hot pressing zones, and two demolding zones; a forming unit disposed in the forming zone and including a forming mold for scooping pulp from a pulp tank and forming a blank unit thereon for every scoop of the pulp; a lower mold unit including four lower molds movable relative to the frame unit along a vertical direction, and an upper mold unit movable between two positions along a moving direction in a repetitive manner and including two upper hot-pressing central molds and two upper hot-pressing transfer molds. The upper mold unit is engageable with the forming mold and a corresponding one of the lower molds in different positions.

9 Claims, 8 Drawing Sheets

FORMING MACHINE FOR PULP PRODUCT

CROSS-REFERENCE TO RELATED APPLICATION

This application claims priority to Taiwanese Invention Patent Application No. 111130105, filed on Aug. 10, 2022.

FIELD

The disclosure relates to a forming machine, and more particularly to a forming machine for a pulp product.

BACKGROUND

Referring to FIG. 1, a forming machine 1, as disclosed in Taiwanese Patent Publication No. 201328860, mainly includes a flipping pulp-suction mechanism 11, a hot-press upper mold 12 and a material transfer mold 13 spaced apart from the flipping pulp-suction mechanism 11 and capable of moving up and down along a vertical direction, a waiting space 14 formed between the hot-press upper mold 12 and the flipping pulp-suction mechanism 11, and a first hot-press lower mold 15 and a second hot-press lower mold 16 capable of moving horizontally relative to the flipping pulp-suction mechanism 11. Through this, the first and second hot-press lower molds 15, 16 can sequentially stay in three positions, namely, below the flipping pulp-suction mechanism 11, the waiting space 14, and below the hot-press upper mold 12 and the material transfer mold 13, so that the purpose of transferring paper pulp blank and twice hot pressing can be achieved.

Although the aforesaid forming machine 1 can be provided with two hot-press upper molds 12, two material transfer molds 13, two first hot-press lower molds 15 and two second hot-press lower molds 16 to increase the production capacity thereof, however, to achieve the purpose of scooping the pulp, hot pressing and demolding, the first and second hot-press lower molds 15, 16 must stay in three positions, in terms of shortening the process time, there is still room for improvement thereof. Further, with the first and second hot-press lower molds 15, 16 working independently using two drive devices, the forming machine 1 has the disadvantages of having many components and high equipment costs.

SUMMARY

Therefore, an object of the present disclosure is to provide a forming machine that can alleviate at least one of the drawbacks of the prior art.

Accordingly, the forming machine for a pulp product of this disclosure includes a frame unit, a forming unit, a lower mold unit, and an upper mold unit. The frame unit defines a forming zone, two hot pressing zones respectively located on two opposite sides of the forming zone, and two demolding zones each of which is located on one side of a respective one of the hot pressing zones that is distal to the forming zone. The forming unit is disposed in the forming zone, and includes a pulp tank for containing pulp, and a forming mold movable relative to the frame unit toward and away from the pulp tank along a vertical direction. The forming mold is configured for scooping the pulp and forming a blank unit thereon for every scoop of the pulp.

The lower mold unit includes four lower molds, two of which are respectively disposed in the hot pressing zones, and the other two of which are respectively disposed in the demolding zones. The lower molds are movable relative to the frame unit along the vertical direction. The upper mold unit is spaced apart from the lower mold unit and the forming mold along the vertical direction, and includes two upper hot-pressing central molds and two upper hot-pressing transfer molds. The upper mold unit is movable between two positions along a moving direction in a repetitive manner.

When the upper mold unit is in one of the positions, one of the upper hot-pressing central molds is located in the forming zone, the other upper hot-pressing central mold is located in one of the hot pressing zones, one of the upper hot-pressing transfer molds is located in the other hot pressing zone, the other upper hot-pressing transfer mold is located in one of the demolding zones, and the forming mold is configured to scoop the pulp from the pulp tank and form a blank unit and is movable to engage the one of the upper hot-pressing central molds for mold pressing the blank unit. The one of the upper hot-pressing central molds is configured to obtain the blank unit from the forming mold.

When the upper mold unit is moved from the one of the positions to the other position, the one of the upper hot-pressing central molds together with the obtained blank unit is located in the other hot pressing zone, one of the lower molds disposed in the other hot pressing zone is movable to engage the one of the upper hot-pressing central molds for hot pressing the blank unit and is configured to receive the blank unit released by the one of the upper hot-pressing central molds, the other upper hot-pressing central mold is located in the forming zone, the forming mold is configured to scoop the pulp from the pulp tank and form another blank unit and is movable to engage the other upper hot-pressing central mold for mold pressing the another blank unit, the other upper hot-pressing central mold is configured to obtain the another blank unit from the forming mold, the one of the upper hot-pressing transfer molds is located in the other demolding zone, and the other upper hot-pressing transfer mold is located in the one of the hot pressing zones.

When the upper mold unit is moved from the other position to the one of the positions, the one of the upper hot-pressing transfer molds is located in the other hot pressing zone, the one of the lower molds disposed in the other hot pressing zone is movable to engage the one of the upper hot-pressing transfer molds for hot pressing the blank unit for a second time, the one of the upper hot-pressing transfer molds is configured to obtain the blank unit from the one of the lower molds, the other upper hot-pressing central mold together with the obtained another blank unit is located in the one of the hot pressing zones, and one of the lower molds disposed in the one of the hot pressing zones is movable to engage the other upper hot-pressing central mold for hot pressing the another blank unit and is configured to receive the another blank unit released by the other upper hot-pressing central mold.

When the upper mold unit is moved again from the one of the positions to the other position, the one of the upper hot-pressing transfer molds together with the obtained blank unit from the one of the lower molds is located in the other demolding zone and is configured to release the blank unit to one of the lower molds disposed in the other demolding zone, the other upper hot-pressing transfer mold is located in the one of the hot pressing zones, the one of the lower molds disposed in the one of the hot pressing zones is movable to engage the other upper hot-pressing transfer mold for hot pressing the another blank unit for a second time, and the other upper hot-pressing transfer mold is configured to obtain the another blank unit from the one of the lower molds.

When the upper mold unit is moved again from the other position to the one of the positions, the other upper hot-pressing transfer mold together with the obtained another blank unit from the one of the lower molds is located in the one of the demolding zones, and is configured to release the another blank unit to one of the lower molds disposed in the one of the demolding zones.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
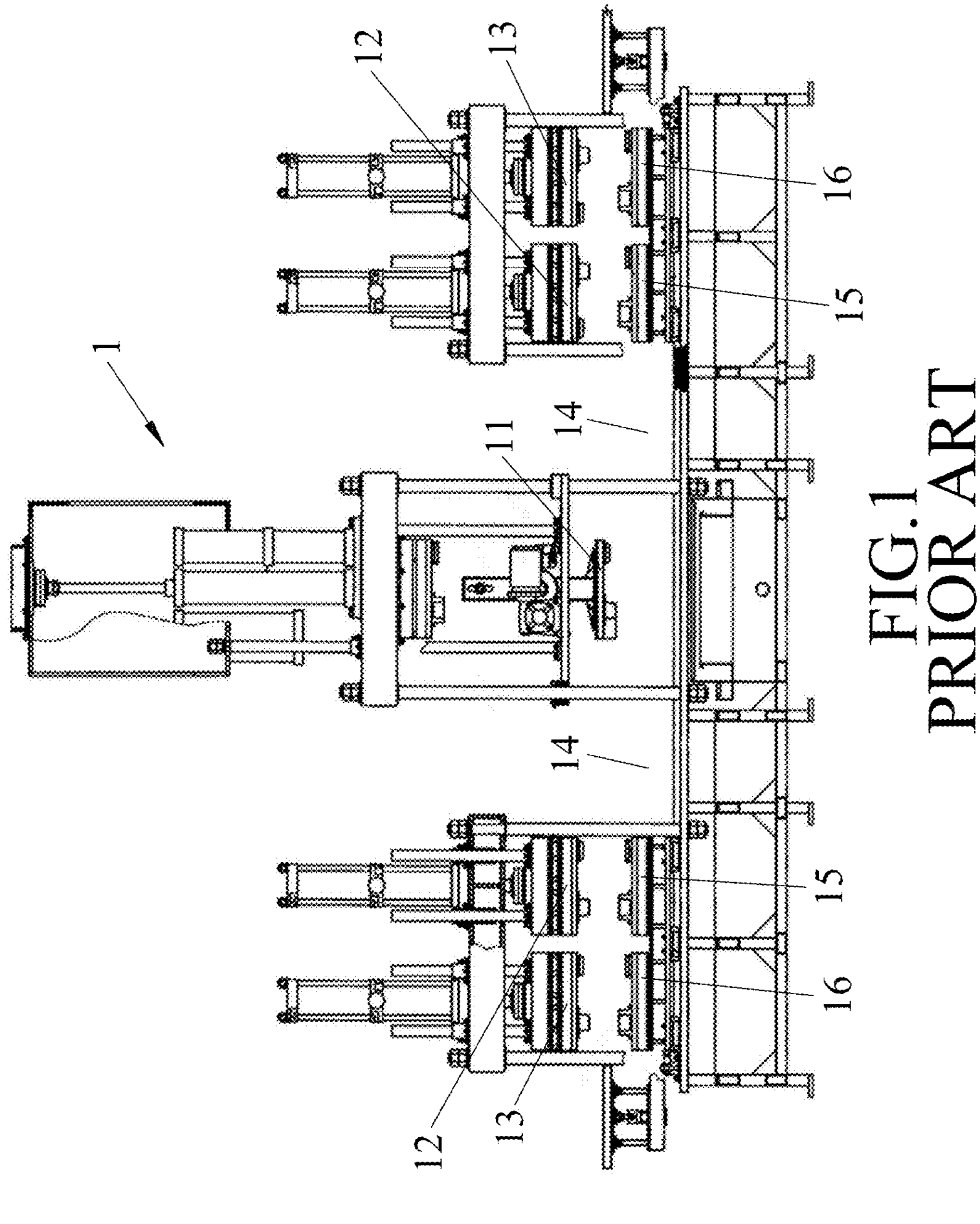
FIG.1 PRIOR ART
FIG. 1 is a front view of a forming machine disclosed in Taiwanese Patent Publication No. 201328860.
Figure 2:
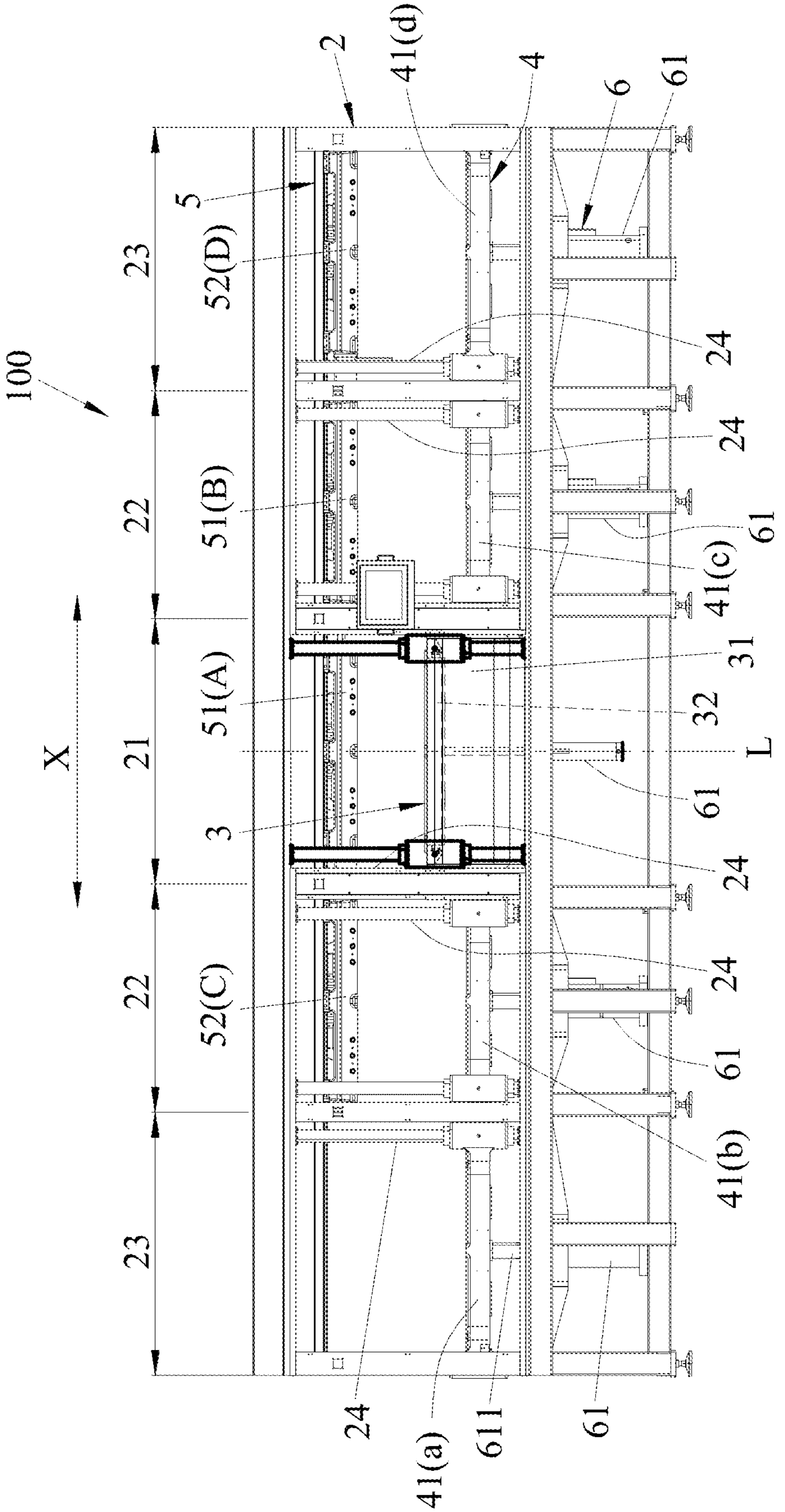
FIG. 2 is a front view of a forming machine according to an embodiment of the present disclosure.
Figure 3:
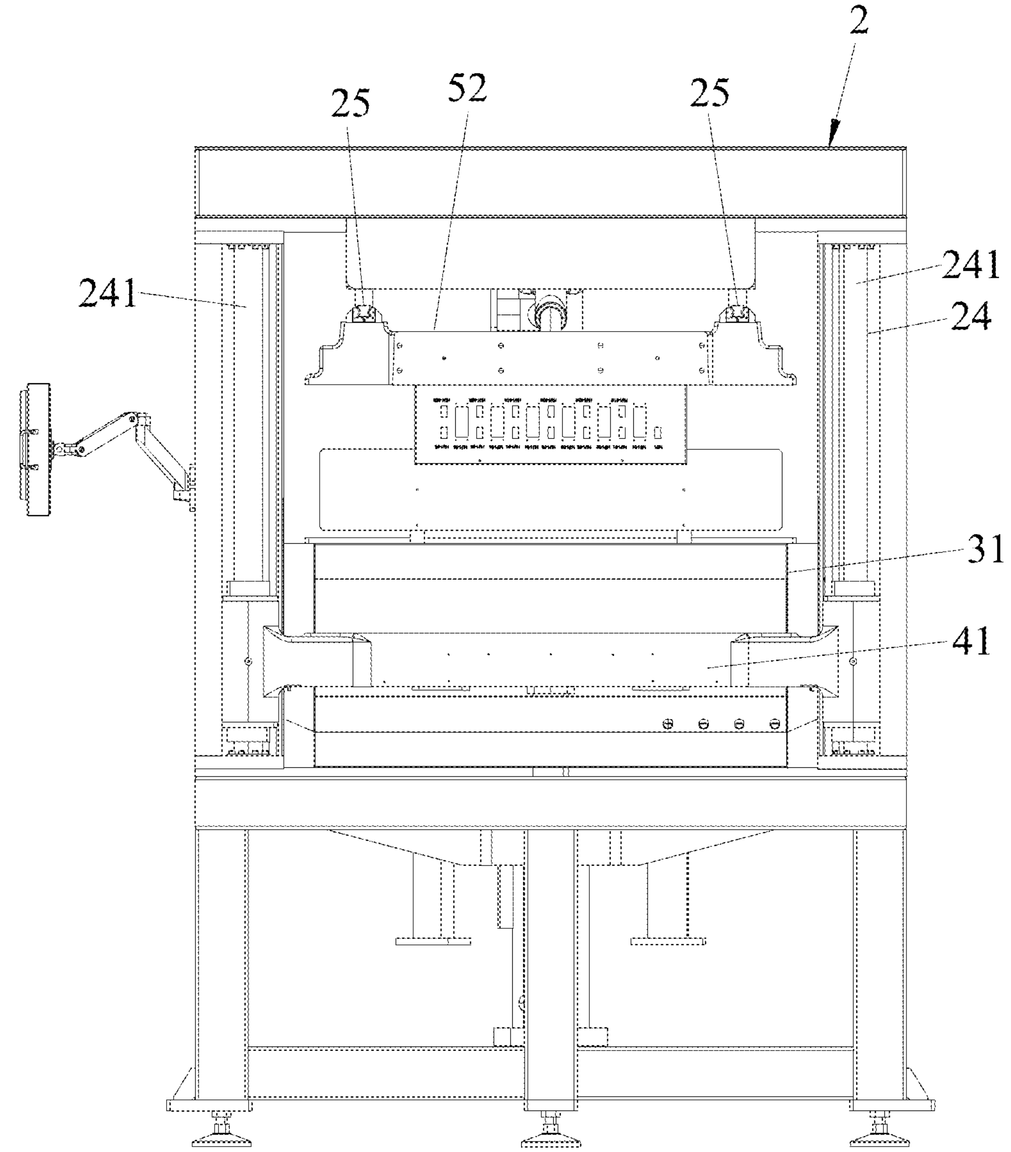
FIG. 3 is a side view of the embodiment.
Figure 4:
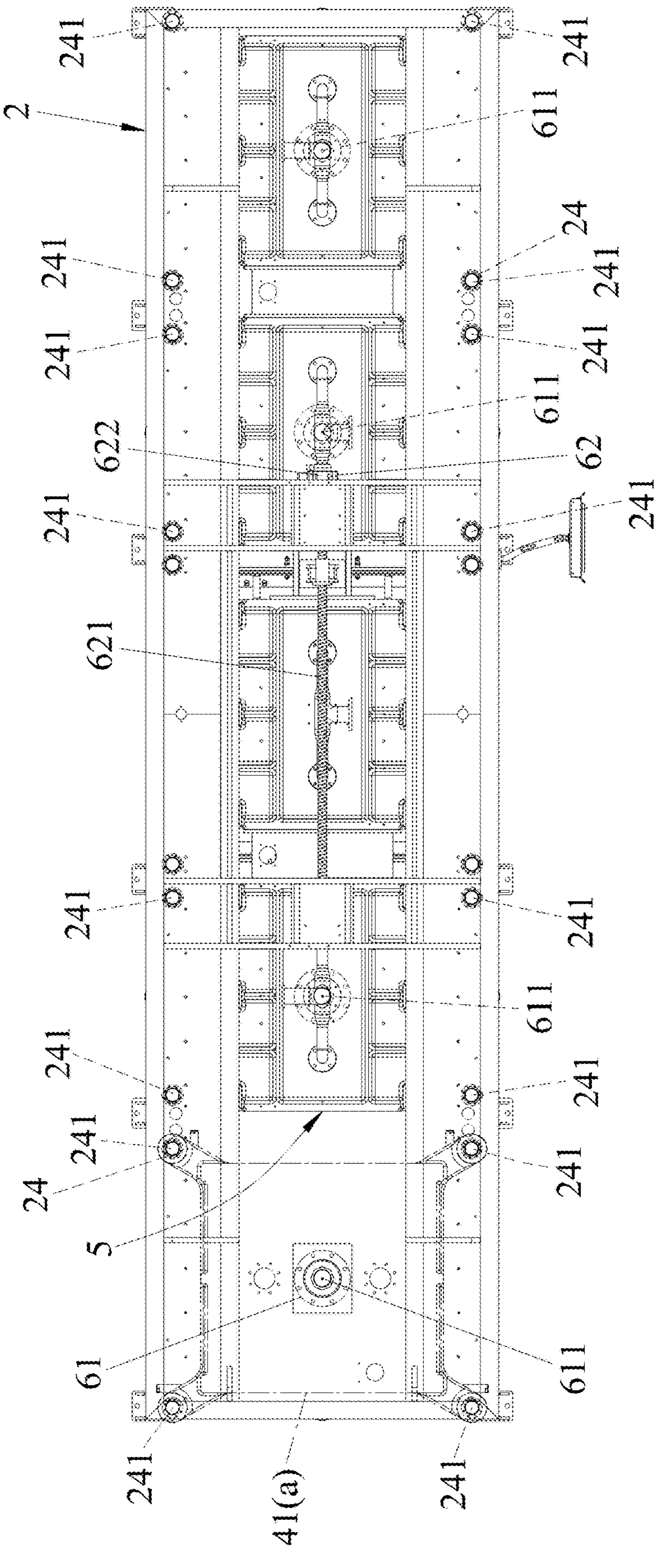
FIG. 4 is a schematic top view of the embodiment.

Referring to FIGS. 2 to 4, a forming machine 100 for a pulp product according to an embodiment of the present disclosure includes a frame unit 2, a forming unit 3, a lower mold unit 4, an upper mold unit 5, and a drive unit 6.

The frame unit 2 defines a forming zone 21, two hot pressing zones 22 respectively located on two opposite sides of the forming zone 21, and two demolding zones 23 each of which is located on one side of a respective one of the hot pressing zones 22 that is distal to the forming zone 21. In this embodiment, the forming zone 21, the hot pressing zones 22 and the demolding zones 23 are arranged along a moving direction (X).

In this embodiment, the frame unit 2 includes five guide post assemblies 24 and two slide rails 25. The guide post assemblies 24 are respectively mounted in the forming zone 21, the hot pressing zones 22 and the demolding zones 23. Each guide post assembly 24 includes four spaced-apart guide posts 241 extending along a vertical direction (L). The slide rails 25 are mounted on a top side of the frame unit 2 parallel to each other, extend along the moving direction (X), and spans the forming zone 21, the hot pressing zones 22 and the demolding zones 23. In this embodiment, the moving direction (X) is substantially perpendicular to the vertical direction (L).

The forming unit 3 is disposed in the forming zone 21, and includes a pulp tank 31 mounted on two parallel rods of the frame unit 2 for containing pulp, and a forming mold 32 disposed above the pulp tank 31 and having a plurality of through holes for passage of fluid therethrough. The forming mold 32 is slidable along the guide posts 241 of a corresponding one of the guide post assemblies 24. Through this, the forming mold 32 is movable toward and away from the pulp tank 31 relative to the guide posts 241 of the corresponding guide post assembly 24, and is immersible in the pulp tank 31 for scooping the pulp and forming a blank unit (I, II, III, IV, V) (see FIG. 8) thereon for every scoop of the pulp. In this embodiment, the pulp is slurry paper pulp, and the blank unit (I, II, III, IV, V) is the pulp product to be obtained by this disclosure.

It is worth noting that, since the scooping of the pulp from the pulp tank 31 through the forming mold 32 and the technique of dehydrating and shaping the pulp are not important aspects of this disclosure, and since those with ordinary skill in the art can infer the expanded details according to the above description, a detailed description thereof is omitted herein.

The lower mold unit 4 includes four lower molds 41, two of which are respectively disposed in the hot pressing zones 22, and the other two of which are respectively disposed in the demolding zones 23. Each lower mold 41 is slidable along the guide posts 241 of the corresponding guide post assembly 24.

The upper mold unit 5 is spaced apart from the lower mold unit 4 and the forming mold 32 along the vertical direction (L), and includes two upper hot-pressing central molds 51 and two upper hot-pressing transfer molds 52. In this embodiment, the upper hot-pressing central molds 51 and the upper hot-pressing transfer molds 52 are arranged along the moving direction (X). One of the upper hot-pressing central molds 51 is connected to the other upper hot-pressing central mold 51. Each upper hot-pressing transfer mold 52 is connected to a respective one of the upper hot-pressing central molds 51. The upper hot-pressing transfer molds 52 move together with the upper hot-pressing central molds 51.

In this embodiment, each lower mold 41 and a corresponding one of the upper hot-pressing central molds 51 or upper hot-pressing transfer molds 52 are capable of obtaining or releasing the blank unit (I, II, III, IV, V) through a positive or negative pressure airflow, and are capable of generating heat through an internal heating structure. Since these features are not important aspects of this disclosure, and since those with ordinary skill in the art can infer the expanded details according to the above description, a detailed description thereof is omitted herein.

Figure 6:
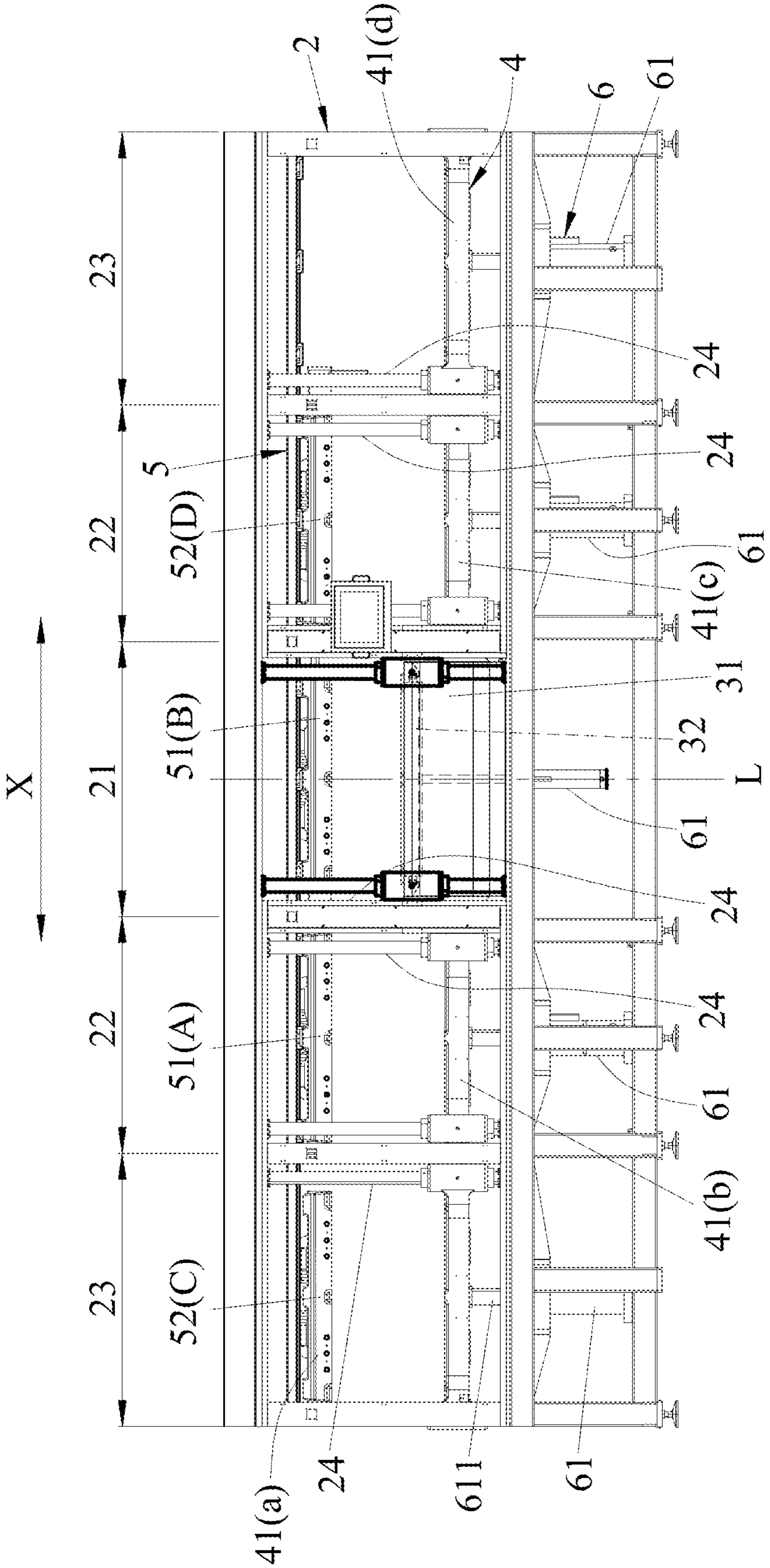
FIG. 6 is a view similar to FIG. 2, but illustrating the upper hot-pressing central molds and the upper hot-pressing transfer molds being moved from a position shown in FIG. 2 to another position along a moving direction.

The upper mold unit 5 is slidable between the slide rails 25, and is movable between two positions along the moving direction (X). For convenience of description, numerals 51A and 51B will be used herein to distinguish the two upper hot-pressing central molds 51, and numerals 52C and 52D will be used herein to distinguish the two upper hot-pressing transfer molds 52. In one of the positions, as shown in FIG. 2, the upper hot-pressing central mold (51A) is located in the forming zone 21, the upper hot-pressing central mold (51B) is located in one of the hot pressing zones 22, the upper hot-pressing transfer mold (52C) is located in the other one of the hot pressing zones 22, and the upper hot-pressing transfer mold (52D) is located in one of the demolding zones 23. In the other position, as shown in FIG. 6, the upper hot-pressing central mold (51A) is located in the other one of the hot pressing zones 22, the upper hot-pressing central mold (51B) is located in the forming zone 21, the upper hot-pressing transfer mold (52C) is located in the other one of the demolding zones 23, and the upper hot-pressing transfer mold (52D) is located in the one of the hot pressing zones 22.

The drive unit 6 includes five lower drive assemblies 61 and an upper drive assembly 62. The lower drive assemblies 61 are respectively disposed in the forming zone 21, the hot pressing zones 22 and the demolding zones 23. Each lower drive assembly 61 may be a hydraulic or pneumatic cylinder, and includes a telescopic rod 611 extending and retracting along the vertical direction (L) for driving the forming mold 32 and the lower molds 41 to move along the vertical direction (L). Through this, the forming mold 32 or each lower mold 41 is movable along the vertical direction (L) between an engaged position and a disengaged position.

When the forming mold 32 is in the engaged position, it is engaged with a corresponding one of the upper hot-pressing central molds 51; and when the forming mold 32 is in the disengaged position, it is disengaged and moved away from the corresponding upper hot-pressing central mold 51.

Each lower mold 41 disposed in the respective hot pressing zone 22 is engaged with a corresponding one of the upper hot-pressing central molds 51 or upper hot-pressing transfer molds 52 when in the engaged position, and is disengaged and moved away from the corresponding one of the upper hot-pressing central molds 51 or upper hot-pressing transfer molds 52 when in the disengaged position. Each lower mold 41 disposed in the respective demolding zone 23 is engaged with a corresponding one of the upper hot-pressing transfer molds 52 when in the engaged position, and is disengaged and moved away from the corresponding upper hot-pressing transfer mold 52 when in the disengaged position.

The upper drive assembly 62 is mounted on the frame unit 2 for driving movement of the upper mold unit 5 along the moving direction (X). In this embodiment, the upper drive assembly 62 includes a threaded rod 621 extending along the moving direction (X) and rotatably mounted on the frame unit 2, and a motor 622 for driving rotation of the threaded rod 621. The threaded rod 621 is threadedly connected to threaded holes in the upper hot-pressing central molds 51 and the upper hot-pressing transfer molds 52.

It should be noted that the upper drive assembly 62 is not limited to including the threaded rod 621 and the motor 622. In other embodiments, the upper drive assembly 621 may be a hydraulic or pneumatic cylinder.

Further, when the telescopic rod 611 of each lower drive assembly 61 is extended or retracted, it can drive the forming mold 32 or the corresponding lower mold 41 to move upward or downward along the vertical direction (L). When the motor 622 drives the threaded rod 621 to rotate, the upper mold unit 5 can be driven to move leftward or rightward along the moving direction (X). Since those with ordinary skill in the art can infer the expanded details according to the above description, a detailed description of the actions of the lower and upper drive assemblies 61, 62 is omitted herein.

Figure 5:
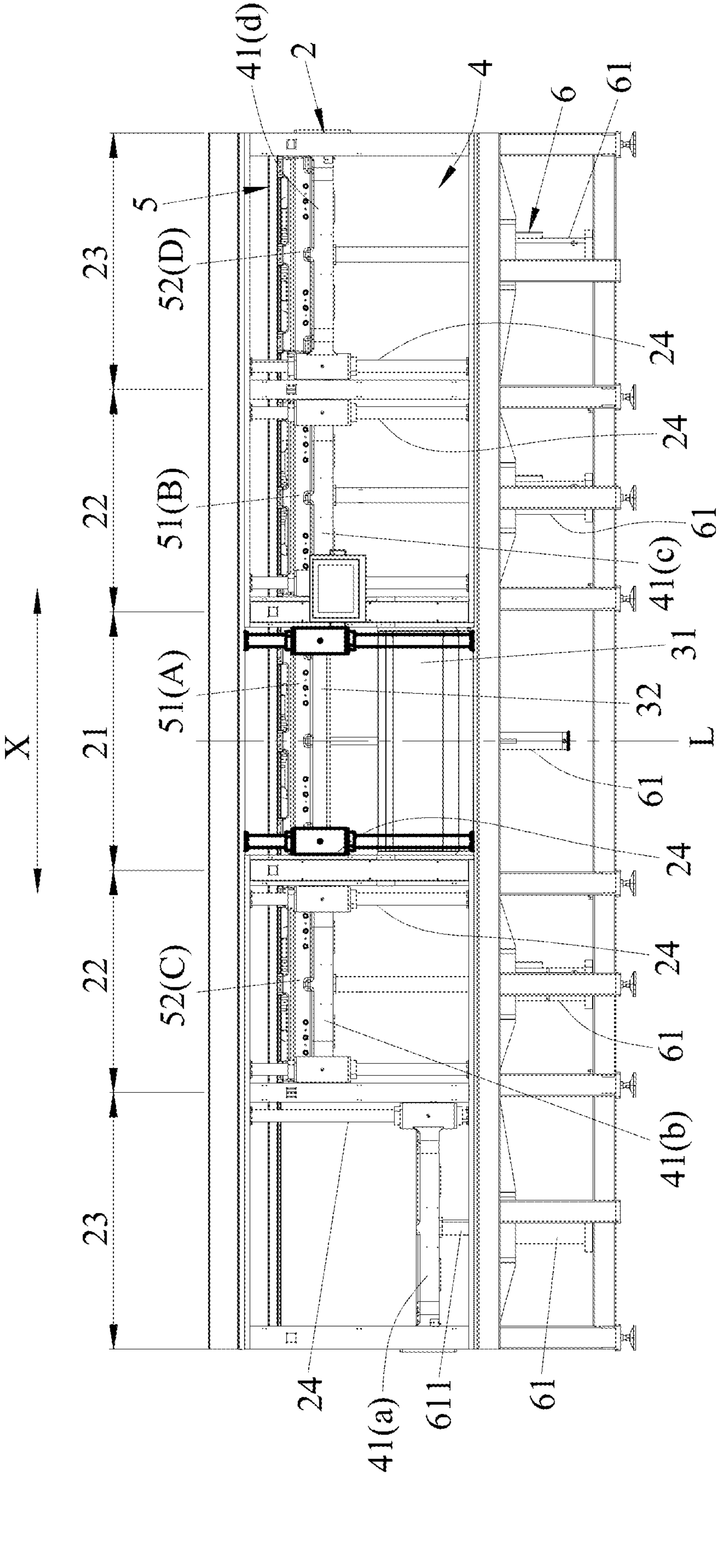
FIG. 5 is a view similar to FIG. 2, but illustrating a forming mold and three lower molds being moved along a vertical direction until engaging with two upper hot-pressing central molds and two upper hot-pressing transfer molds.
Figure 8:
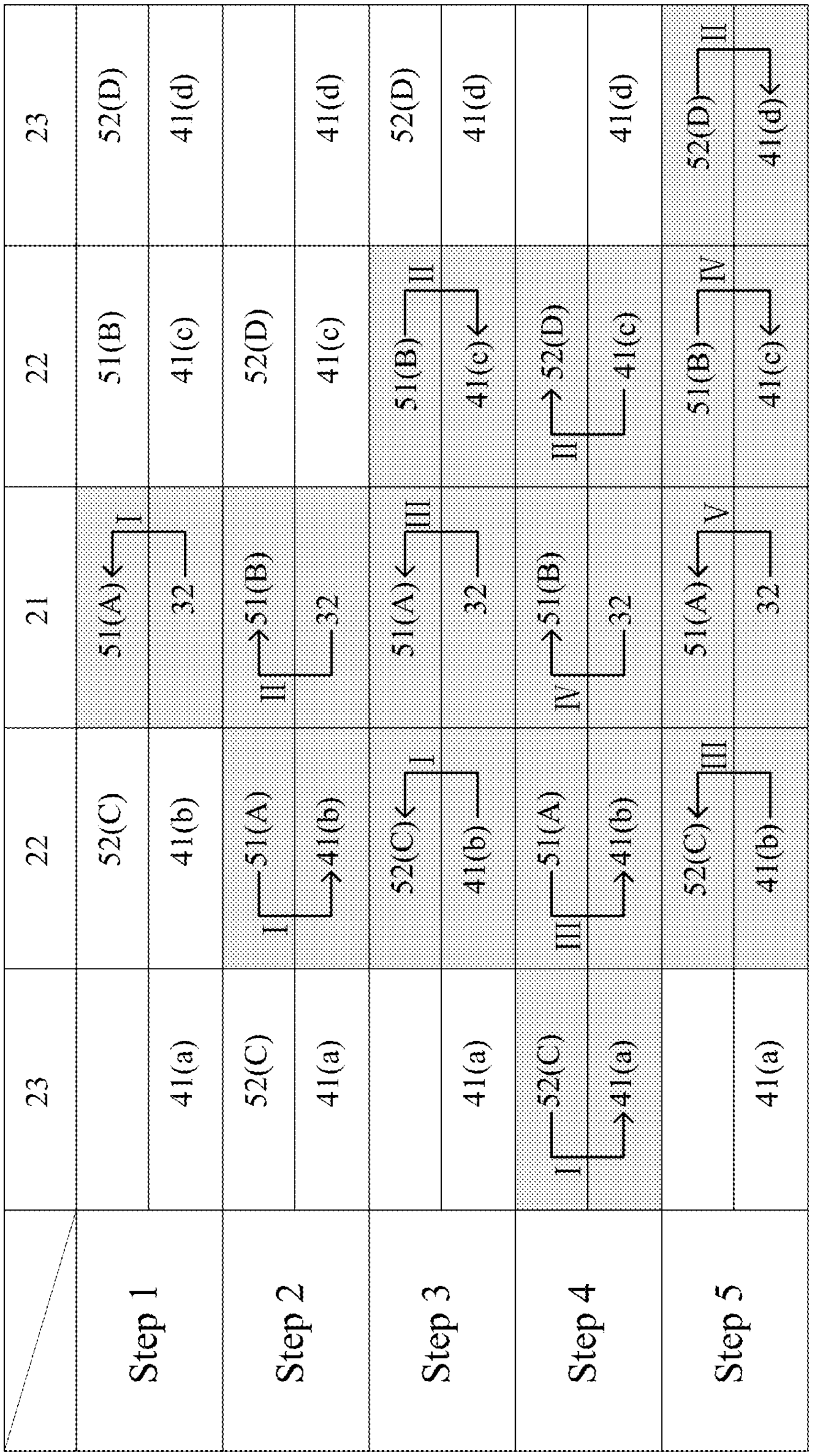
FIG. 8 is a diagram illustrating the sequence of transfer of a plurality of blank units of this embodiment.

For convenience of description, numerals 41*a*, 41 *b*, 41*c* and 41*d* will be used hereinafter to distinguish the four lower molds 41. To distinguish the moving sequence of the upper mold unit 5, the manufacturing process of the pulp product is as follows:

Step 1: Referring to FIGS. 2, 5 and 8, when the upper mold unit 5 is in the position shown in FIG. 2, the forming mold 32 is driven to move down and scoop the pulp from the pulp tank 31 so as to form a first blank unit (I). The forming mold 32 is then driven to move up until it engages the upper hot-pressing central mold (51A) for mold pressing the first blank unit (I). At this time, the upper hot-pressing central mold (51A) will draw or suck the first blank unit (I) to separate from the forming mold 32 through a negative pressure airflow, and the forming mold 32 is driven to move down and away from the upper hot-pressing central mold (51A) until it is immersed in the pulp tank 31. The first blank unit (I) is retained in the upper hot-pressing central mold (51A).

Figure 7:
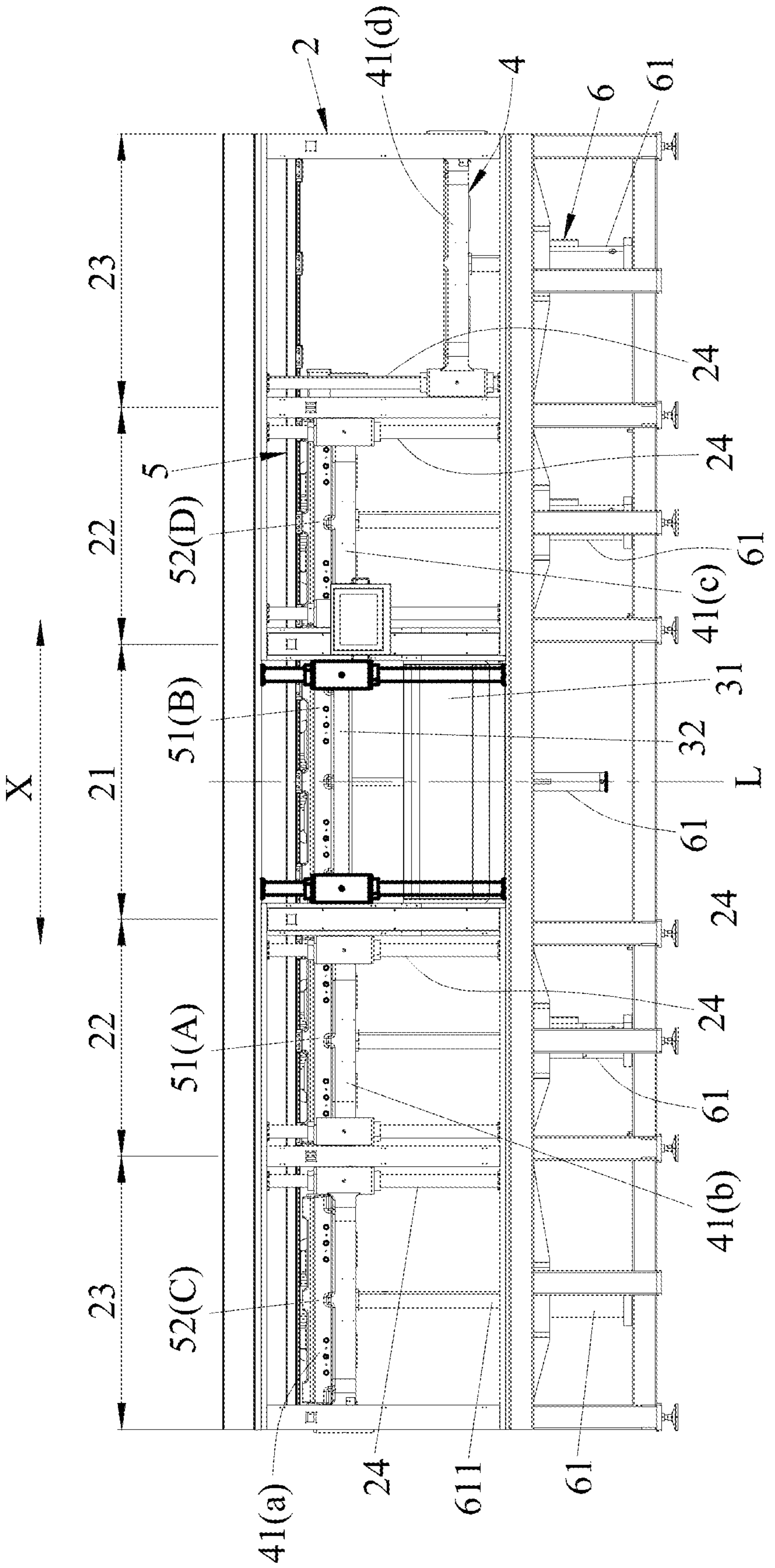
FIG. 7 is a view similar to FIG. 5, but illustrating the upper hot-pressing central molds and the upper hot-pressing transfer molds in the another position.

Step 2: Referring to FIGS. 6 to 8, when the upper mold unit 5 is moved from the position shown in FIG. 2 to the position shown in FIG. 6, the lower mold (41*b*) is driven to move up until it engages the upper hot-pressing central mold (51A) to hot-press the first blank unit (I). Afterwards, the lower mold (41*b*) is driven to move down and away from the upper hot-pressing central mold (51A). At this time, the upper hot-pressing central mold (51A) will push the first blank unit (I) to separate therefrom through a positive pressure airflow, and the lower mold (41*b*) will absorb the first blank unit (I) through a negative pressure airflow, so that the first blank unit (I) is located therein.

On the other hand, the forming mold 32 is activated to scoop the pulp from the pulp tank 31 so as to form a second blank unit (II), and is then driven to move up until it engages the upper hot-pressing central mold (51B). At this time, the upper hot-pressing central mold (51B) will draw or suck the second blank unit (II) to separate from the forming mold 32 through the negative pressure airflow, and the forming mold 32 is driven to move down and away from the upper hot-pressing central mold (51B) until it is immersed in the pulp tank 31. The second blank unit (II) is retained in the upper hot-pressing central mold (51B).

Step 3: With reference to FIGS. 2, 5 and 8, when the upper mold unit 5 is moved from the position shown in FIG. 6 to the position shown in FIG. 2, the lower mold (41*b*) is driven to move up until it engages the upper hot-pressing transfer mold (52C) to hot-press the first blank unit (I) for a second time. Afterwards, the lower mold (41*b*) is driven to move down and away from the upper hot-pressing transfer mold (52C). At this time, the lower mold (41*b*) will push the first blank unit (I) to separate therefrom through a positive pressure airflow, and the upper hot-pressing transfer mold (52C) will draw or suck the first blank unit (I) through a negative pressure airflow, so that the first blank unit (I) is located therein.

On the other hand, the lower mold (41*c*) is driven to move up until it engages the upper hot-pressing central mold (51B) to hot-press the second blank unit (II). Afterwards, the lower mold (41*c*) is driven to move down and away from the upper hot-pressing central mold (51B). At this time, the upper hot-pressing central mold (51B) will push the second blank unit (II) to separate therefrom through a positive pressure airflow, and the lower mold (41*c*) will absorb the second blank unit (II) through a negative pressure airflow, so that the second blank unit (II) is located thereon.

Furthermore, the forming mold 32 is activated to scoop the pulp from the pulp tank 31 so as to form a third blank unit (III), and is then driven move up until it engages the upper hot-pressing central mold (51A). At this time, the upper hot-pressing central mold (51A) will draw or suck the third blank unit (III) to separate from the forming mold 32 through a negative pressure airflow, and the forming mold 32 is driven to move down and away from the upper hot-pressing central mold (51A) until it is immersed in the pulp tank 31. The third blank unit (III) is retained in the upper hot-pressing central mold (51A).

Step 4: With reference to FIGS. 6 to 8, when the upper mold unit 5 is moved again from the position shown in FIG. 2 to the position shown in FIG. 6, the lower mold (41*a*) is driven to move upward until it engages the upper hot-pressing transfer mold (52C). Afterwards, the upper hot-pressing transfer mold (52C) will push the first blank unit (I) to separate therefrom through a positive pressure airflow, and the lower mold (41*a*) will absorb the first blank unit (I) through a negative pressure airflow, so that the first blank unit (I) is located on the lower mold (41*a*), thereby completing the demolding of the first blank unit (I).

It is worth noting that after the first blank unit (I) is demolded, the first blank unit (I) can be transferred manually by hand, by mechanical arm, by a suction carrier, or by other equipment for sequential edge trimming, defect detection, packaging and other processes.

On the other hand, the lower mold (41*c*) is driven to move up until it engages the upper hot-pressing transfer mold (52D) to hot-press the second blank unit (II) for a second time. Afterwards, the lower mold (41*c*) is driven to move down and away from the upper hot-pressing transfer mold (52D). At this time, the lower mold (41*c*) will push the second blank unit (II) to separate therefrom through a positive pressure airflow, and the upper hot-pressing transfer mold (52D) will absorb the second blank unit (II) through a negative pressure airflow, so that the second blank unit (II) is located therein.

Furthermore, the lower mold (41*b*) is driven to move up until it engages the upper hot-pressing central mold (51A) to hot-press the third blank unit (III). Afterwards, the lower mold (41*b*) is driven to move down and away from the upper hot-pressing central mold (51A). At this time, the upper hot-pressing central mold (51A) will push the third blank unit (III) to separate therefrom through a positive pressure airflow, and the lower mold (41*b*) will absorb the third blank unit (III) through a negative pressure airflow, so that the third blank unit (III) is located therein.

Moreover, the forming mold 32 is activated to scoop the pulp from the pulp tank 31 so as to form a fourth blank unit (IV), and is then driven to move up until it engages the upper hot-pressing central mold (51B). At this time, the upper hot-pressing central mold (51B) will draw or suck the fourth blank unit (IV) to separate from the forming mold 32 through a negative pressure airflow, and the forming mold 32 is driven to move down and away from the upper hot-pressing central mold (51B) until it is immersed in the pulp tank 31. The fourth blank unit (IV) is retained in the upper hot-pressing central mold (51B).

Step 5: With reference to FIGS. 2, 5 and 8, when the upper mold unit 5 is moved again from the position shown in FIG. 6 to the position shown in FIG. 2, the lower mold (41*d*) is driven to move up until it engages the upper hot-pressing transfer mold (52D). Afterwards, the upper hot-pressing transfer mold (52D) will push the second blank unit (II) to separate therefrom through a positive pressure airflow, and the lower mold (41*d*) will absorb the second blank unit (II) through a negative pressure airflow, so that the second blank unit (II) is located therein, thereby completing the demolding of the second blank unit (II).

Similarly, after the second blank unit (II) is demolded, it can be transferred manually by hand, by mechanical arm, by a suction carrier, or by other equipment for sequential edge trimming, defect detection, packaging and other processes.

On the other hand, the lower mold 41(*b*) is driven to move up until it engages the upper hot-pressing transfer mold (52C) to hot-press the third blank unit (III) for a second time. Afterwards, the lower mold (41*b*) is driven to move down and away from the upper hot-pressing transfer mold (52C). At this time, the lower mold (41*b*) will push the third blank unit (III) to separate therefrom through a positive pressure airflow, and the upper hot-pressing transfer mold (52C) will absorb the third blank unit (III) through a negative pressure airflow, so that the third blank unit (III) is located therein.

Furthermore, the lower mold 41(*c*) is driven to move up until it engages the upper hot-pressing central mold (51B) to hot-press the fourth blank unit (IV). Afterwards, the lower mold (41*c*) is driven to move down and away from the upper hot-pressing central mold (51B). At this time, the upper hot-pressing central mold (51B) will push the fourth blank unit (IV) to separate therefrom through a positive pressure airflow, and the lower mold (41*c*) will absorb the fourth blank unit (IV) through a negative pressure airflow, so that the fourth blank unit (IV) is located therein.

Moreover, the forming mold 32 is activated to scoop the pulp from the pulp tank 31 so as to form a fifth blank unit (V), and is then driven to move up until it engages the upper hot-pressing central mold (51A). At this time, the upper hot-pressing central mold (51A) will draw or suck the fifth blank unit (V) to separate from the forming mold 32 through a negative pressure airflow, and the forming mold 32 is driven to move down and away from the upper hot-pressing central mold (51A) until it is immersed in the pulp tank 31. The fifth blank unit (V) is retained in the upper hot-pressing central mold (51A).

By repeating the aforesaid steps, when the upper mold unit 5 is located in the positions shown in FIGS. 5 and 7, the first, third, fifth . . . and other blank units (I, III, V . . . ) formed in order in odd numbers can complete the processes of first hot pressing, second hot pressing and demolding in sequence. When the upper mold unit 5 is located in the positions shown in FIGS. 2 and 6, the second, fourth . . . and other blank units (II, IV . . . ) formed in order in even numbers can complete the processes of first hot pressing, second hot pressing and demolding in sequence.

It should be noted that the hot pressing of the first to fifth blank units (I, II, III, IV, V) for the second time is not limited to the positions shown in FIGS. 2 to 8, which are in the hot pressing zones 22. In other embodiments, as shown in FIG. 8, when the lower mold (41*a*) is engaged with the upper hot-pressing transfer mold (52C) and the lower mold (41*d*) is engaged with the upper hot-pressing transfer mold (52D), the second hot pressing may be performed in the corresponding demolding zone 23. Of course, the first hot pressing and the second hot pressing may be performed in the corresponding hot pressing zone 22, after which a third hot pressing may be performed in the corresponding demolding zone 23.

Through this, it is only necessary to change the engaging time of the upper hot-pressing transfer mold (52C) with the lower mold (41*b*) or lower mold (41*a*), or change the engaging time of the upper hot-pressing transfer mold (52D) with the lower mold (41*c*) or lower mold (41*d*), so as to determine the location and the number of times of hot pressing. For example, the engaging time of the upper hot-pressing transfer mold (52C) with the lower mold (41*b*) may be controlled to be within 6 seconds for transferring the corresponding blank unit (I, III, V) from the lower mold (41*b*) to the upper hot-pressing transfer mold (52C), after which the engaging time of the upper hot-pressing transfer mold (52C) with the lower mold (41*b*) may be controlled to about 50 seconds for performing a second hot pressing. Of course, after the second hot pressing, the engaging time of the upper hot-pressing transfer mold (52C) with the lower mold (41*b*) may be controlled again to about 50 seconds for performing a third hot pressing.

Furthermore, the lower molds 41 and the forming mold 32 may be moved up and down together or individually according to actual requirements, and will not affect the first hot pressing, the second hot pressing and the demolding processes. Since those with ordinary skill in the art can infer the expanded details according to the above description, a detailed description thereof is omitted herein.

Through the aforesaid description, the advantages of this disclosure can be summarized as: The forming machine 100 of this disclosure can allow each blank unit (I-V) to form firstly, after which it can undergo first hot pressing, second hot pressing and demolding sequentially. Most importantly, the upper mold unit 5 only need to be moved left or right once to stay in two positions, and can perform different processes, such as forming, hot pressing and demolding for up to four blank units at the same time. Through this, not only the processing time can be shortened, but also the upper mold unit 5 only need to use one drive source (i.e., the motor 622) that cooperates with a threaded rod 621 to achieve the purpose of synchronous movement of the upper hot-pressing central molds 51 and the upper hot-pressing transfer molds 52. Hence, the structure of this disclosure can be simplified, and the equipment costs thereof can be reduced.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A forming machine for a pulp product, comprising:

a frame unit defining a forming zone, two hot pressing zones respectively located on two opposite sides of said forming zone, and two demolding zones each of which is located on one side of a respective one of said hot pressing zones that is distal to said forming zone;

a forming unit disposed in said forming zone and including a pulp tank for containing pulp, and a forming mold movable relative to said frame unit toward and away from said pulp tank along a vertical direction, said forming mold being configured for scooping the pulp and forming a blank unit thereon for every scoop of the pulp;

a lower mold unit including four lower molds, two of which are respectively disposed in said hot pressing zones, and the other two of which are respectively disposed in said demolding zones, said four lower molds being movable relative to said frame unit along the vertical direction; and an upper mold unit spaced apart from said lower mold unit and said forming mold along the vertical direction, said upper mold unit including two upper hot-pressing central molds and two upper hot-pressing transfer molds, said upper mold unit being movable between two positions along a moving direction in a repetitive manner;

wherein, when said upper mold unit is in one of said positions, one of said upper hot-pressing central molds is located in said forming zone, the other one of said upper hot-pressing central molds is located in one of said hot pressing zones, one of said upper hot-pressing transfer molds is located in the other one of said hot pressing zones, the other one of said upper hot-pressing transfer molds is located in one of said demolding zones, and said forming mold is configured to scoop the pulp from the pulp tank and form a blank unit and is movable to engage said one of said upper hot-pressing central molds for mold pressing the blank unit, said one of said upper hot-pressing central molds being configured to obtain the blank unit from said forming mold;

wherein, when said upper mold unit is moved from said one of said positions to the other one of said positions:

said one of said upper hot-pressing central molds together with the obtained blank unit is located in said other one of said hot pressing zones;

one of said lower molds disposed in said other one of said hot pressing zones is movable to engage said one of said upper hot-pressing central molds for hot pressing the blank unit, and is configured to receive the blank unit released by said one of said upper hot-pressing central molds;

said other one of said upper hot-pressing central molds is located in said forming zone;

said forming mold is configured to scoop the pulp from the pulp tank and form another blank unit, and is movable to engage said other one of said upper hot-pressing central molds for mold pressing the another blank unit, said other one of said upper hot-pressing central molds being configured to obtain the another blank unit from said forming mold; and said one of said upper hot-pressing transfer molds is located in the other one of said demolding zones, and said other one of said upper hot-pressing transfer molds is located in said one of said hot pressing zones;

wherein, when said upper mold unit is moved from said other one of said positions to said one of said positions:

said one of said upper hot-pressing transfer molds is located in said other one of said hot pressing zones;

said one of said lower molds disposed in said other one of said hot pressing zones is movable to engage said one of said upper hot-pressing transfer molds for hot pressing the blank unit for a second time, said one of said upper hot-pressing transfer molds being configured to obtain the blank unit from said one of said lower molds;

said other one of said upper hot-pressing central molds together with the obtained another blank unit is located in said one of said hot pressing zones; and one of said lower molds disposed in said one of said hot pressing zones is movable to engage said other one of said upper hot-pressing central molds for hot pressing the another blank unit, and is configured to receive the another blank unit released by said other one of said upper hot-pressing central molds;

wherein, when said upper mold unit is moved again from said one of said positions to said other one of said positions:

said one of said upper hot-pressing transfer molds together with the obtained blank unit from said one of said lower molds is located in said other one of said demolding zones, and is configured to release the blank unit to one of said lower molds disposed in said other one of said demolding zones;

said other one of said upper hot-pressing transfer molds is located in said one of said hot pressing zones; and said one of said lower molds disposed in said one of said hot pressing zones is movable to engage said other one of said upper hot-pressing transfer molds for hot pressing the another blank unit for a second time, said other one of said upper hot-pressing transfer molds being configured to obtain the another blank unit from said one of said lower molds;

wherein, when said upper mold unit is moved again from said other one of said positions to said one of said positions, said other one of said upper hot-pressing transfer molds together with the obtained another blank unit from said one of said lower molds is located in said one of said demolding zones, and is configured to release the another blank unit to one of said lower molds disposed in said one of said demolding zones.

2. The forming machine as claimed in claim 1, wherein said forming zone, said two hot pressing zones and said two demolding zones are arranged along the moving direction which is substantially perpendicular to the vertical direction.

3. The forming machine as claimed in claim 1, wherein said forming mold is movable along the vertical direction between an engaged position, in which said forming mold is engaged with a corresponding one of said upper hot-pressing central molds, and a disengaged position, in which said forming mold is disengaged and moved away from the corresponding one of said upper hot-pressing central molds.

4. The forming machine as claimed in claim 1, wherein:

each of said lower molds is movable along the vertical direction between an engaged position and a disengaged position;

each of said lower molds disposed in a respective one of said hot pressing zones is engaged with a corresponding one of said upper hot-pressing central molds or said upper hot-pressing transfer molds when in said engaged position, and is disengaged and moved away from the corresponding one of said upper hot-pressing central molds or said upper hot-pressing transfer molds when in said disengaged position;

each of said lower molds disposed in a respective one of said demolding zones is engaged with a corresponding one of said upper hot-pressing transfer molds when in said engaged position, and is disengaged and moved away from the corresponding one of said upper hot-pressing transfer molds when in said disengaged position.

5. The forming machine as claimed in claim 1, further comprising a drive unit which includes five lower drive assemblies respectively disposed in said forming zone, said two hot pressing zones and said two demolding zones, each of said lower drive assemblies including a telescopic rod extending and retracting along the vertical direction for driving said forming mold and said lower molds to move along the vertical direction, each of said lower drive assemblies being one of a hydraulic cylinder and a pneumatic cylinder.

6. The forming machine as claimed in claim 5, wherein said frame unit includes five guide post assemblies respectively mounted in said forming zone, said two hot pressing zones and said two demolding zones, each of said guide post assemblies including a plurality of spaced-apart guide posts extending along the vertical direction, each of said forming mold and said lower molds being slidable along said guide posts of a corresponding one of said guide post assemblies.

7. The forming machine as claimed in claim 1, wherein said frame unit further includes at least one slide rail extending along the moving direction and spanning said forming zone, said two hot pressing zones and said two demolding zones, said upper mold unit being slidable on said at least one slide rail.

8. The forming machine as claimed in claim 7, wherein said one of said upper hot-pressing central molds is connected to said other one of said upper hot-pressing central molds, and each of said upper hot-pressing transfer molds is connected to a respective one of said upper hot-pressing central molds, said upper hot-pressing transfer molds moving together with said upper hot-pressing central molds.

9. The forming machine as claimed in claim 7, further comprising a drive unit which includes an upper drive assembly mounted on said frame unit for driving said upper mold unit to move along the moving direction, said upper drive assembly being one of a hydraulic cylinder, a pneumatic cylinder and a combination of a threaded rod and a motor.

* * * * *